Oct. 21, 1958   G. A. LYON   2,857,209
WHEEL COVER
Filed Sept. 24, 1956
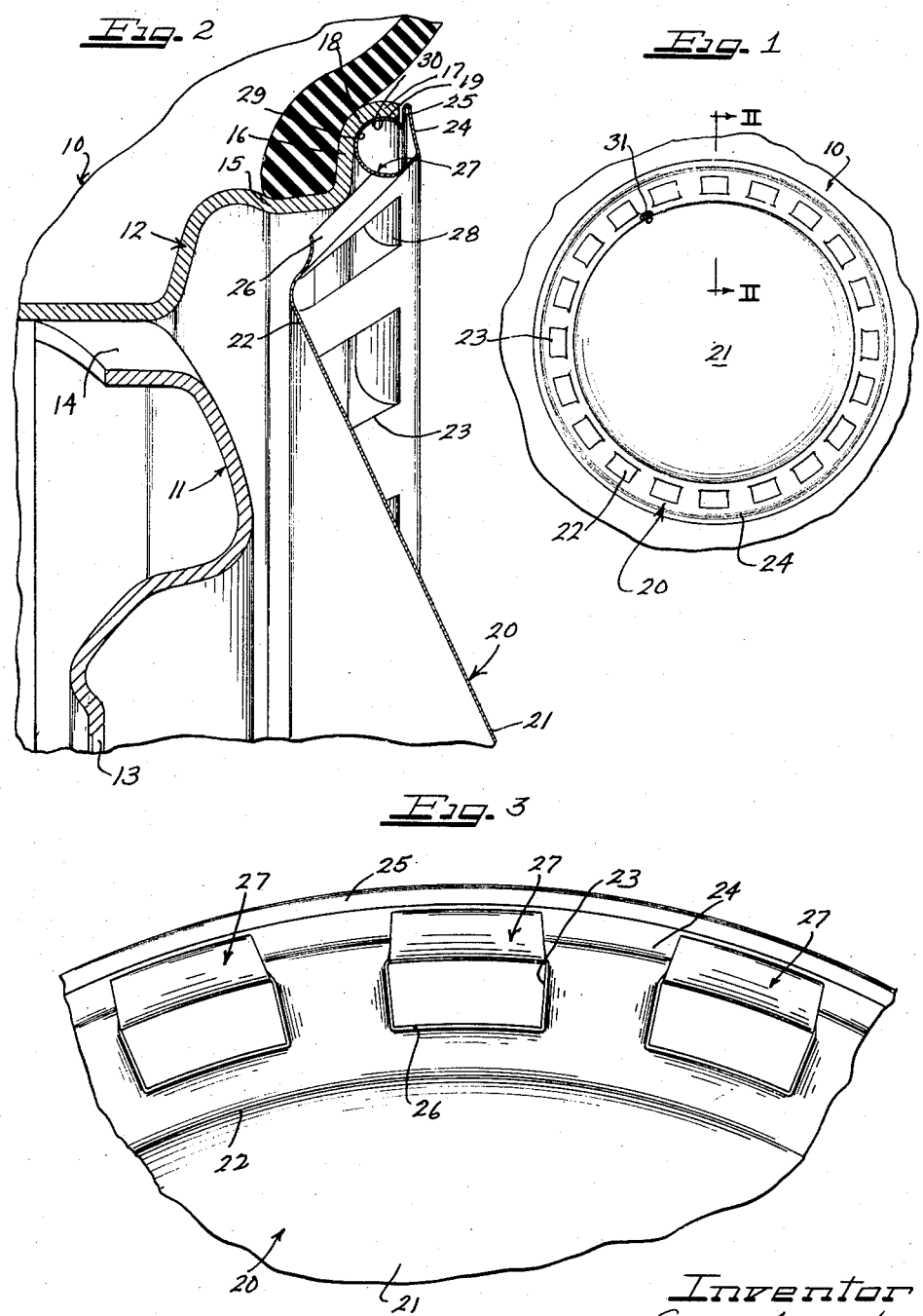
Inventor
GEORGE ALBERT LYON

United States Patent Office 2,857,209
Patented Oct. 21, 1958

2,857,209

WHEEL COVER

George Albert Lyon, Detroit, Mich.

Application September 24, 1956, Serial No. 611,520

6 Claims. (Cl. 301—37)

This invention relates generally to a wheel structure and more particularly to an ornamental wheel cover member for protective retained disposition on the outer side of a vehicle wheel.

Due to the constant public demand made upon automobile manufacturers to provide the public with an outstanding distinctive automobile, the automobile wheel cover manufacturers are called upon by the automobile manufacturers to help meet this demand by providing fanciful highly outstanding wheel covers which are capable of functioning in accordance with modern day engineering requirements.

In order to cope with some of the engineering problems, such as the tendency of modern day wheels to become overheated during operation, the present wheel structure is provided with openings in the wheel and cover openings in the cover. These openings are arranged in an effective manner for promoting air circulation to cool the wheel. Another problem which the manufacturers are faced with concerns providing a low cost cover structure which is capable of developing gripping characteristics so that the cover may not be readily disengaged from the wheel during operation and which may upon the use of proper tools be removed from the wheel without harming the cover so that it may subsequently be replaced on the wheel and coact with the rim as effectively as before.

Accordingly, an object of this invention is to provide a highly ornamental and fanciful wheel cover member.

Still another object of this invention is to provide a new and improved wheel cover construction which is capable of engaging a wheel under tension in detachable assembly.

A further object of this invention is to provide a new and improved cover and wheel assembly which promotes air circulation through the wheel.

Yet another object of this invention is to provide an ornamental wheel cover which may be economically produced on a large production scale.

According to the general features of this invention there is provided in a wheel structure, a wheel having rim and body parts including connected radial and axial rim flanges having a junction and a terminal rim flange and with the wheel having circumferentially spaced wheel openings, a cover member having an intermediate dished portion provided with circumferentially spaced cover openings and with the cover material removed to form the openings turned under and providing circumferentially spaced resiliently deflectable retaining finger extensions and which are arranged in a common circle having a diameter slightly at variance with the terminal rim flange, the fingers having a terminal portion in nested detachable cover retaining cooperation with the terminal rim flange and the cover openings being generally opposite the wheel openings to facilitate air circulation therethrough to cool the wheel, the finger extensions each having an inclined radially inner baffle portion positioned at an inclined angle to the axial rim flanges and acting as a baffle in directing moving air generally radially inwardly through the cover openings.

Other objects and features of this invention will more fully become apparent in view of the following detailed description taken in conjunction with the accompanying sheet of drawings illustrating therein a single embodiment and in which:

Figure 1 is a fragmentary side elevation of my wheel structure;

Figure 2 is an enlarged fragmentary cross-sectional view taken substantially along the lines II—II of Figure 1 looking in the direction indicated by the arrows; and Figure 3 is an enlarged fragmentary rear elevation of my wheel cover.

As shown on the drawings:

The reference numeral 10 indicates generally my wheel structure having a body part 11 and a multi-flanged drop center type of tire rim 12. The tire rim has centrally located openings 13 through which lugs carried on an axle of an automobile (not shown) may be inserted so that nuts may be threaded onto the lugs to clamp the body part 11 to the axle.

At circumferentially spaced intervals generally at the junction of the body part 11 with the tire rim 12 is provided wheel openings 14. These openings open rearwardly on to the brake drum area of the wheel and may be associated with conventional means generally at the brake drum area of the wheel for promoting air circulation axially outwardly through the wheel openings 14.

The tire rim 12 has an intermediate axial flange 15 which is connected at its axially outer end to a generally radially outwardly extending rim flange 16 which is in turn also connected at its outer end to a generally axially outwardly extending terminal rim flange 17. At the junction of the rim flanges 16 and 17 is provided an annular seat 18. The terminal rim flange 17 is slightly curled to provide a shoulder 19.

In overlying disposition upon my vehicle wheel is my highly ornamental and attractive wheel cover member 20. The wheel cover member 20 may be made from any suitable material although it will be appreciated excellent results may be attained through making the wheel cover from stainless steel. This is especially true since a wheel cover of this type has a longer lasting attractive appearance and resists the weather elements. Also, as here, where the retaining means are formed out of the cover material the use of stainless spring steel facilitates the development of the requisite resiliency in the retaining means so that the cover may be self-sustaining upon a vehicle wheel.

The cover 20 includes an enlarged raised central crown portion 21 which is generally convexly curved and has an intermediate dished cover portion 22 disposed generally at the outer margin of the crown portion 21. The cover at the dished cover portion 22 extends first generally radially outwardly axially inwardly and then radially and axially outwardly. In other words, the dished portion 22 is defined by radially inner and radially outer diverging areas with the radially outer diverging area having radially inner and radially outer portions disposed on opposite sides of the junction between the radial and axial rim flanges 15 and 16. It is on the radially and axially outwardly extending surface or diverging area of the intermediate dished portion 22 where circumferentially spaced cover openings 23 are provided. Each of the openings 23 are positioned generally opposite the wheel openings 14 and face to a certain extent the intermediate rim flange 15.

Disposed at the outer margin of the dished portion 22 is a generally radially and axially outwardly extending cover terminal portion 24 which terminates in an underturned reinforcing bead 25 which is disposed in face to face close proximity to the terminal rim flange 17.

The openings 23 are struck out with the material struck out, turned under and formed into generally axially rearwardly extending edges 26. One of the edges, namely the radially and axially outermost edge is so formed to provide resilient finger extensions 27. Each of the finger extensions 27 are adapted to nest in the annular groove 18 and are adapted to coact with the shoulder 19 in such a manner that the cover 20 is maintained in detachable backed up retaining engagement upon the wheel. Each of the extensions 27 are generally C-shaped and each include a radially inner portion 28, an intermediate portion 29, and a radially outer portion 30. The radially inner oprtion 28 is positioned generally opposite the intermediate rim flange 15. When air is circulated through the wheel openings 14, it is directed toward the intermediate flange 15 and after it strikes the intermediate flange 15 it is deflected axially outwardly against the finger portion 28 which acts as a baffle and directs the air out through the wheel openings 23. By bottoming these edges 23, the air may be channelled between the side edges 23 and compartmentalized as it is moved axially outwardly and directed toward and against the baffle or finger portion 28. It is in this manner that circulation of air through the wheel is promoted.

The cover 20 may be assembled upon the wheel by generally axially aligning the finger extensions 27 with the terminal rim flange 17 and upon the application of an axial force the cover may be pressed into snap-on, pay-off bottomed engagement with the vehicle wheel. It will be noted the intermediate finger portions 29 are bottomed against the radial rim flange 16 and in this manner inward deflection of the cover is resisted so that the retaining extensions 27 may be protected. In the present instance, when the cover 20 is in assembly on the wheel, the valve stem 31 extends through the cover.

To remove the cover from the wheel a suitable pry-off tool may be inserted underneath the bead 25 and upon the application of an axial force the margin 24 may be caused to be pried outwardly with the result that the force is transferred through the margin 24 of the cover in such a manner that the radially outer terminals 30 may be lifted out of engagement and slid over and along the radially inner surface of the terminal rim flange 17 until the cover is removed.

To further resist inward deflection of the cover 20 when assembled with the wheel, and further to resist turning of the cover, the generally radially and axially outwardly extending side edges 26 engage in edgewise bottomed engagement against the junction of the intermediate rim flange 15 with the generally radial rim flange 16.

It will be understood that modifications and variations may be effected without departing from the scope of the novel concepts of the present invention.

I claim:

1. In a wheel structure, a wheel having rim and body parts including connected radial and axial rim flanges having a junction and a terminal rim flange and with the wheel having circumferentially spaced wheel openings, a cover member having an intermediate dished portion which is defined by junctioned radially inner and radially outer diverging areas with the radially outer diverging area having inner and outer end portions disposed on radially inner and outer sides of the junction between the radial and axial rim flanges, said outer diverging area provided with circumferentially spaced cover openings and with the cover material removed to form the openings turned under and providing circumferentially spaced resiliently deflectable retaining finger extensions confronting the radial and terminal rim flange and which are arranged in a common circle having a diameter slightly at variance with said terminal rim flange, said fingers having a curved terminal portion in nested detachable cover retaining cooperation with said terminal rim flange and said cover openings being generally opposite the wheel openings to facilitate air circulation therethrough to cool the wheel.

2. In a wheel structure, a wheel having rim body parts including connected radial and axial rim flanges having a junction and a terminal rim flange and with the wheel having circumferentially spaced wheel openings, a cover member having an intermediate dished portion which is defined by junctioned radially inner and radially outer diverging areas with the radially outer diverging area having inner and outer end portions disposed on radially inner and outer sides of the junction between the radial and axial rim flanges, said outer diverging area provided with circumferentially spaced cover openings and with the cover material removed to form the openings turned under and providing circumferentially spaced resiliently deflectable retaining finger extensions and which are arranged in a common circle having a diameter slightly at variance with said terminal rim flange, said fingers having a terminal portion in nested detachable cover retaining cooperation with said terminal rim flange and said cover openings being generally opposite the wheel openings to facilitate air circulation therethrough to cool the wheel, said finger extensions each having an inclined radially inner baffle portion positioned at an inclined angle to the axial rim flange and acting as a baffle in directing moving air generally radially in its movement through said wheel openings.

3. In a wheel structure, a wheel having rim and body parts including connected radial and axial rim flanges having a junction and a terminal rim flange and with the wheel having circumferentially spaced wheel openings, a cover member having an intermediate dished portion which is defined by junctioned radially inner and radially outer diverging areas with the radially outer diverging area having inner and outer end portions disposed on radially inner and outer sides of the junction between the radial and axial rim flanges, said outer diverging area provided with circumferentially spaced cover openings and with the cover material removed to form the openings turned under and providing circumferentially spaced resiliently deflectable retaining finger extensions confronting the radial and terminal rim flange and which are arranged in a common circle having a diameter slightly at variance with said terminal rim flange, said fingers having a terminal portion in nested detachable cover retaining cooperation with said terminal rim flange and said cover openings being generally opposite the wheel openings to facilitate air circulation therethrough to cool the wheel, said finger extensions each having an inclined radially inner baffle portion positioned at an inclined angle to the axial rim flange and acting as a baffle in directing moving air generally radially inwardly through said cover openings, said cover having generally radially and axially outwardly extending side edges at opposite sides of said cover openings cooperable with the baffle portion to reinforce the cover and in providing a channel for directing air through said wheel and cover openings.

4. In a wheel structure, a wheel having rim and body parts including connected radial and axial rim flanges having a junction and a terminal rim flange and with the wheel having circumferentially spaced wheel openings, a cover member having an intermediate dished portion which is defined by junctioned radially inner and radially outer diverging areas with the radially outer diverging area having inner and outer end portions disposed on radially inner and outer sides of the junction between the radial and axial rim flanges, said outer diverging area provided with circumferentially spaced cover openings and with the cover material removed to form the openings turned under and providing circumferentially spaced resiliently deflectable retaining finger extensions confronting the radial and terminal rim flange and which are arranged in a common circle having a diameter slightly at variance with said terminal rim flange, said fingers having a terminal portion in nested detachable cover retaining cooperation with said terminal rim flange and said cover openings being generally opposite the wheel openings to facilitate air circulation therethrough to cool the wheel, said finger extensions each having an inclined radially inner baffle portion positioned at an inclined angle to the axial rim flange and acting as a baffle in directing moving air generally radially inwardly through said cover openings, said cover having generally radially and axially outwardly extending side edges at opposite sides of said cover openings cooperable with the baffle portion to reinforce the cover and in providing a channel for directing air through said wheel and cover openings, said finger extensions being generally C-shaped and having intermediate and terminal portions nestingly engaged and bottomed against the radial and terminal rim flanges respectively in detachable engagement therewith.

5. In a wheel structure, a wheel having rim and body parts including connected axial, radial and terminal axial rim flanges and with the wheel having circumferentially spaced wheel openings, a cover member having an intermediate dished portion which is defined by junctioned radially inner and radially outer diverging areas with the radially outer diverging area having inner and outer end portions disposed on radially inner and outer sides of the junction between the radial and axial rim flanges, said outer diverging area provided with circumferentially spaced cover openings and with the cover material removed to form the openings turned under and provdiing circumferentially spaced resiliently deflectable retaining finger extensions confronting the radial and terminal rim flange and which are arranged in a common circle having a diameter slightly at variance with said terminal rim flanges, said fingers being in detachable cover retaining cooperation with the rim and said cover openings being generally opposite the wheel openings to facilitate air circulation therethrough to cool the wheel, said fingers each being wedge shaped and having an outer edge in gripping biting engagement with the rim, said cover having generally radially and axially outwardly extending side edges at opposite sides of said cover openings cooperable with the baffle portion to reinforce the cover and in providing a channel for directing air through said cover openings, said side edges being bottomed against the rim junction to back up said extensions and to compartmentalize air in its movement against said baffle portion.

6. In a wheel structure, a wheel having rim and body parts including connected radial and axial rim flanges having a junction and a terminal rim flange, a cover member having an intermediate dished portion which is defined by junctioned radially inner and radially outer diverging areas with the radially outer diverging area having inner and outer end portions disposed on radially inner and outer sides of the junction between the radial and axial rim flanges, said outer diverging area provided with circumferentially spaced cover openings and with the cover material removed to form the openings turned under and providing circumferentially spaced resiliently deflectable retaining finger extensions confronting the radial and terminal rim flanges, and which are arranged in a common circle having a diameter slightly at variance with the terminal rim flange, said cover having generally radially and axially inwardly turned side edges at opposite sides of the cover openings for abutment against the junction to reinforce the cover generally at the area of the cover openings and which side edges cooperable with the tire rim in providing a channel for directing air through the cover openings, said fingers having a terminal portion in cover retaining cooperation with the terminal rim flange.

References Cited in the file of this patent

UNITED STATES PATENTS

| | | |
|---|---|---|
| 2,094,326 | Lyon | Sept. 28, 1937 |
| 2,231,931 | Lyon | Feb. 18, 1941 |
| 2,368,238 | Lyon | Jan. 30, 1945 |